United States Patent [19]
Kranz

[11] 3,770,226
[45] Nov. 6, 1973

[54] CONTROL DEVICE FOR ADJUSTING A PENDULUM CONTROL OF A FLYING BODY

[75] Inventor: Walter Kranz, Munich, Germany

[73] Assignee: Bolkow Gesellschaft mit beschrankter Haftung, Munich, Germany

[22] Filed: Apr. 18, 1968

[21] Appl. No.: 723,349

[52] U.S. Cl. ............................ 244/3.21, 244/42.41
[51] Int. Cl. ............................................. B64c 21/08
[58] Field of Search .................... 244/42.41, 3.21; 102/105

[56] References Cited
UNITED STATES PATENTS

| | | | |
|---|---|---|---|
| 2,816,721 | 12/1957 | Taylor | 244/3.21 X |
| 2,841,344 | 7/1958 | Stroukoff | 244/42.41 |
| 2,873,074 | 2/1959 | Harris, Jr. et al. | 244/3.21 |
| 2,873,931 | 2/1959 | Fleischmann | 244/42.41 |
| 3,128,063 | 4/1964 | Kaplan | 244/42.41 |
| 3,261,576 | 7/1966 | Valyi | 244/42.41 X |
| 3,262,658 | 7/1966 | Reilly | 244/42.41 |
| 3,410,502 | 11/1968 | Leadon et al. | 102/105 X |

FOREIGN PATENTS OR APPLICATIONS

| | | | |
|---|---|---|---|
| 893,103 | 1/1944 | France | 244/42.41 |

Primary Examiner—Robert F. Stahl
Attorney—John J. McGlew and Alfred E. Page

[57] ABSTRACT

A control device for adjusting a pivotal control wing or similar surface defining member particularly for flying bodies includes means for directing a fluid stream of liquid, gas or pulverant material transverse to the flow stream over the control surface. The pendulum control comprises, for the purpose of this application, control surfaces which are not subject to exterior control forces effected by mechanical control elements. The fluid screen or stream which is provided to control purposes the pivotal orientation of the wing in respect to the body may be directed outwardly from the control surface itself or from a body adjacent the surface and advantageously separate fluid stream controls are provided for the top and bottom of each pivotal surface to be controlled and the fluid stream control is preferably connected for blowing in selected areas.

14 Claims, 8 Drawing Figures

PATENTED NOV 6 1973 3,770,226
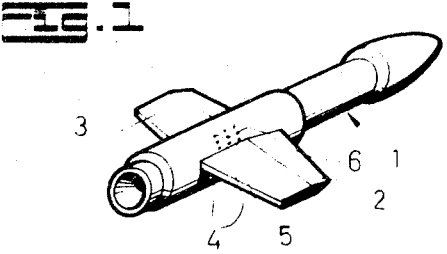
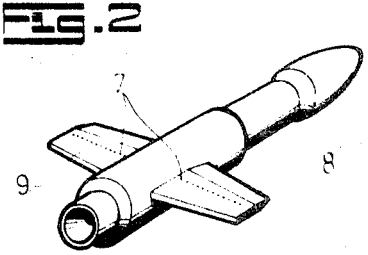
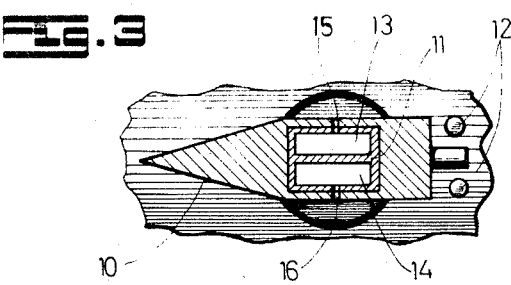
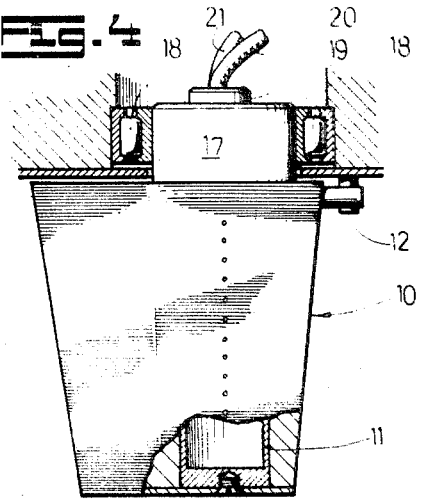
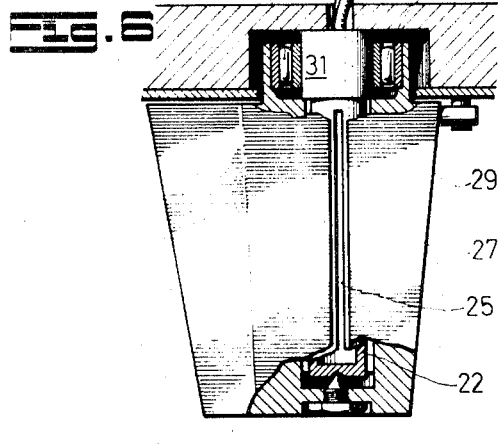
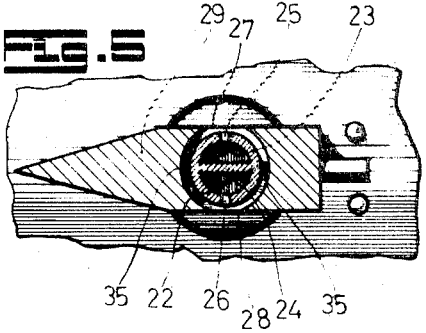
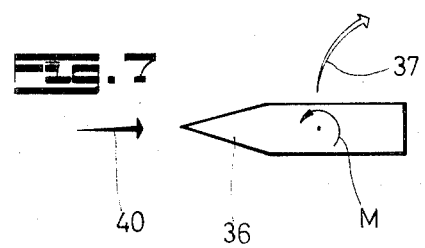
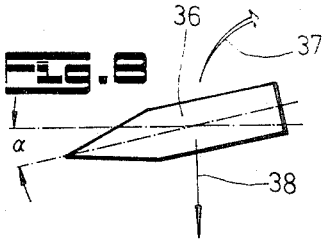
INVENTOR
Walter Kranz
by
ATTORNEYS

CONTROL DEVICE FOR ADJUSTING A PENDULUM CONTROL OF A FLYING BODY

SUMMARY OF THE INVENTION

This invention relates in general to flying body control devices and in particular to a new and useful control device for adjusting a freely pivotally mounted control wing or flap.

A freely pivotable control surface is meant to comprise all control surfaces which are not subject to exterior control forces effected by mechanical control elements. In this sense, for example, a part of an aircraft control rudder which is movably connected with the rudder fin can be included as long as no control forces are effected by the pilot.

A freely pivotal control surface always adjusts to an equilibrium in the current or air stream surrounding it. In the equilibrium position, all moments produced by mass and flow forces about the axis of rotation are balanced. By means of flaps or spoilers it is possible to change the distribution of thrust forces caused by the current on the surface of the control in a manner such that the control adjusts to a new position of equilibrium corresponding to a changed angle of incidence and a changed drive force. The operating pilot or a servo-unit, for instance, will actuate the flaps or spoilers instead of the control itself whereupon the control adjusts to a position corresponding to the flap or spoiler position. In this manner, large control surfaces can be actuated by relatively small adjusting forces. Such devices are known, for instance, as aerodynamic trimming flaps or trimming spoilers for aircraft control rudders.

U.S. Pat. No. 2,852,209 shows an example of an elevator for planes which is controlled by the aerodynamic effect of a combined spoiler-flap system within a certain partial range of its possible angle of incidence. This system is actuated mechanically by the pilot through pull ropes. Such devices require expensive control means for their operation. These can be constructed either as purely mechanical rod and rope connections, or they can consist, for example, of electrical, electromagnetic, hydraulic or similar servomotors which are directly connected with the flaps or spoilers. In addition to the considerable construction and weight requirements, such devices have the disadvantage of being subject to continuous wear and their accuracy and functional safety are impaired by fluctuating exterior temperatures and long storage. It has been found that especially for controls with a narrow high-speed profile, as used, for instance, for flying bodies, that it is often impossible for space reasons to arrange flaps or spoilers with their associated operating devices.

Other devices for actuating controls include the coupling of two spoilers for effecting a control of one spoiler by the other spoiler. With such a construction, the servomotors and the coupling devices can be kept relatively small.

In accordance with the present invention, there is provided a control device which does not require servomotors, coupling gear or other mechanically operating means. In accordance with the invention, a screen or veil of liquid, gas or pulverant material is blown selectively into the current flowing on either the upper or the lower surface of the pendulum control in a direction which is substantially transverse to the current flow.

The invention is distinct from the known devices in which energy-rich air is blown into the boundary layer of aircraft wings in order to prevent a detachment of the boundary layer. The control is also distinct from the use of impulse devices for the control of jets of a VTOL aircraft for example to provide a jet assisted take-off. With the present construction, the blown-out medium is used to influence the free flow around a control and thus produce the adjusting forces for the control.

In accordance with the invention, the required control medium is either stored in containers and supplied to the various openings adjacent the pivotal control surface by suitable feeding devices or it may be produced in a gas generator, for example. The control medium may be carried in the body of the aircraft and directed along one or more rows above the control surface with the rows being separately selectively controllable in order to vary the location of the control medium and influence the amount of change which is produced thereby. In another embodiment the control medium is blown directly outwardly from the control surface itself. The control medium is advantageously supplied through two separate channels for connecting to a discharge above and below the control surface, respectively.

Accordingly it is an object of the invention to provide a control device for adjusting a freely rotatable pendulum control, particularly for flying bodies, which includes a stream of a medium which is selectively blown adjacent the vicinity of the control surface advantageously transverse to the current stream.

A further object of the invention is to provide a flying body having a control surface which is not influenced by a mechanical control and which includes means for directing a stream of a medium in the vicinity of the control surface against the current stream and wherein the means for directing the stream is located either in the flying body proper or in the control surface itself and wherein the control surface is pivotally mounted on the aircraft body.

A further object of the invention is to provide a control device which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 1 is a perspective view of a flying body having a control for adjusting a control constructed in accordance with the invention;

FIG. 2 is a view similar to FIG. 1 of another embodiment of the invention;

FIG. 3 is a partial transverse sectional view of a pendulum control surface having a control constructed in accordance with the invention;

FIG. 4 is a partial longitudinal and partial top plan view of another embodiment of control surface with control device;

FIG. 5 is a view similar to FIG. 3 of another embodiment of the invention;

FIG. 6 is a view similar to FIG. 4 of the embodiment indicated in FIG. 5; and

FIGS. 7 and 8 show schematic views of a pendulum control constructed in accordance with the invention and in two different operating positions.

GENERAL DESCRIPTION OF THE PREFERRED EMBODIMENTS

Referring to the drawings in particular, the invention embodied therein in FIG. 1 comprises a flying body 1 having two oppositely arranged freely pivotal controls or wings 2 and 3 which project outwardly from respective sides of the flying body. In accordance with the invention, three rows 4, 5 and 6 of blowout openings are arranged in each sidewall of the flying body, one set above and one set below each control. Each row is advantageously separately connected by means inside the flying body to produce a flow of a medium which will be directed out in the form of a stream or screen which acts as a spoiler on a selected side of the control surface 2 or 3. By the arrangement of several rows of openings it is possible to change the position of the screen, and if desired the angle of discharge of the medium may be varied from row to row for any particular control effects which may be desired.

The connection of the openings 4, 5 and 6 to a storage container or gas generator may be in any known manner such as by conduit or hoses which will be described in respect to the embodiments of FIGS. 4 and 6 hereinafter.

In the embodiment of FIG. 2, blow-out openings 7 are arranged in the surface of the pendulum controls 8 and 9. The rows of openings can extend in the span direction from the root to the tip of the control so that the suitable control may be effected over the whole span.

Several examples of the construction of a supply of the control medium are shown in FIGS. 3 to 6. The control 10 shown in FIG. 3 is fixed to the spar 11, and the control and the spar rotate jointly. The rotating movement is limited by abutments 12, 12 in order to prevent a disruption of the flow which would occur if the angle of incidence became too high.

As indicated, the spar 11 is divided into two separate channels 13 and 14 which have discharge bores connected to the respective blow-out openings 15 or 16 arranged on the respective upper and lower sides of the control.

At the root of the control 10 there is provided a rotatable journal 17 which is rotatably supported within a flying body housing on a bearing 18. Two separate supply lines 20 and 21 are connected to the end 19 of the spar 11 and supply the associated channels 13 and 14 with a control medium. The supply conduits 20 and 21 are flexible so that they are capable of following the rotational movement of the control bar 11.

In the embodiment indicated in FIGS. 5 and 6, instead of openings there is provided a continuous slot 25 for the discharge of the medium. A spar 22 is divided into two channels 23 and 24 and each channel has an associated slot 25 and/or 26 which aligns with a corresponding blow-out slot 27 or 28 in the body of the pendulum control 29. The spar 22 is firmly connected with the flying body housing. The control 29 is arranged on roller bearing 30 on section 31 of the spar adjacent the flying body. The connection of the supply conduits 33 and 34 may be rigid in view of the immobility of the spar. However, in this construction a seal 35 must be provided between the spar 22 and the pendulum control 29 so that no equalization of pressure between the upper side and the lower side of the control can take place.

In FIGS. 7 and 8, the operation of the spoiler-like control device constructed in accordance with the invention is shown in a schematic manner. The screen 37 of the control medium which is ejected on the upper side of the control 36 when the control is in a position of equilibrium shown in FIG. 7 causes an over-pressure on that side of the control surface on the part thereof which is located in front of the screen 37 in the flow direction designated by the arrow 40, and a sub-pressure is produced on the surface lying immediately behind the screen 37. The resultant moment M is effective about the rotational axis of the pendulum control to adjust the control in a counterclockwise direction and turn it through an angle $\alpha$ to a new position, as indicated in FIG. 8. Thereby a lifting force 38 is produced in proportion to the angle $\alpha$ and this is utilized as a control force for the flying body.

In a most favorable interpretation, it can be seen that in accordance with the arrangements of FIGS. 2 to 8 the thrust force produced by the impulse of the existing mass of control medium supports the adjusting moment as well as the lifting force 38. There is a further possibility of arranging several rows of openings or blow-out slots one behind the other in a profile direction in order to be able to balance a shift of aerodynamic center over wide areas of the flow velocity.

The pendulum control is in a position of equilibrium during stationary flight. The line of application of the resultants of all air and mass forces acting on the control goes through the axis of rotation. If, for instance, a screen of control medium transverse to the flow is blown out into the free upper or lower side flow of the pendulum control, the screen acts like a spoiler. In front of the screen a zone of higher pressure and behind it a zone of lower pressure, compared to the indisturbed flow condition, is formed. The resulting displacement of the air-force resultants causes the control to adjust to a new position, in which again the resultant of all acting forces, now changed as to position and amount, goes through the axis of rotation such that the moments around the axis of rotation are balanced.

The angle of oscillation of the pendulum control can be controlled by varying the intensity, i.e. the amount or speed of the medium, or by varying the location and/or direction of the screen. There also is a possibility to leave the screen unchanged and to restrict the angle of oscillation of the control mechanically by stops. Particularly large adjusting moments are obtained by arranging the screen in the area of the rear edge of the control, since the effective lever arm between the position of the screen and the rotation axis of the control is largest in that position.

A feature of the invention provides that the control medium is discharged in span direction from blowout openings arranged in the body. Such an arrangement is especially suitable for the control of pendulum controls of small span, since the jet only has a limited depth of penetration into the current.

Several groups of blow-out openings may be arranged behind each other in the direction of the depth of profile so that the position of the control screen is changeable. The structural requirements for such a device are minor, since the rotatable control is not connected with any components of the device.

For pendulum controls of larger span, the invention provides a construction in which the control medium is blown out substantially perpendicularly to the control surface from discharge openings arranged in the upper and/or underside of the pendulum control.

The discharge openings may be distributed over the entire span such that an even screen over the entire control can be obtained.

What is claimed is:

1. A control device for adjusting a control surface such as a wing in relationship to its associated flying body, comprising a flying body, at least one wing member defining a control surface in the air flow surrounding said flying body and being pivotally mounted on said flying body, and control means for controlling the relative position of said wing member in respect to said flying body for varying the course influencing effect of the wing member in respect to the flying body including means for directing a screen of a control medium into the airflow adjacent said control surface to pivot said member relative to said body for changing its control influence position.

2. A control device, according to claim 1, wherein said control means is located to direct said screen transversely to the flow direction.

3. A control device, according to claim 1, wherein said control means is located to direct said screen outwardly in the span direction of said wing member.

4. A control device, according to claim 1, wherein said control means is located to direct said control medium in a form of a fluid stream out in a direction substantially perpendicular to the surface of said wing member.

5. A control device, according to claim 1, wherein said wing member includes a hollow spar portion extending outwardly from said flying body, said wing member bracing said spar and defining a control surface surrounding said spar with screen medium openings thereon, said control means directing the control medium through said hollow spar and out the openings on said control surface.

6. A control device according to claim 5, wherein said spar is provided with two through passages, one of which opens to the top of said control and the other of which opens to the bottom of said control.

7. A control device according to claim 5, wherein said hollow spar is pivoted on said flying body, said control being affixed to said spar for rotation therewith.

8. A control device according to claim 5, wherein said hollow spar is affixed to said flying body, said control being pivoted on said spar.

9. A flying body having a body portion, at least one control member pivotally mounted in relation to said flying body and extending outwardly therefrom, and means for directing a control medium in the vicinity of said control member on at least one side thereof for producing a control reaction to said control member, including at least one nozzle on said body portion for drawing the control medium from the interior of said body and disengaging it in the vicinity of the control member at substantially right angles to the flow over said control member.

10. A flying body according to claim 9, including spar means rotatably mounting said control member on said aircraft.

11. A flying body according to claim 9, including spar means affixed to said control member, and separate means rotatably supporting said control member on said flying body.

12. A flying body having a body portion, at least one control member pivotally mounted in relation to said flying body and extending outwardly therefrom, and means for directing a control medium in the vicinity of said control member on at least one side thereof for producing a control reaction to said control member, said pendulum control member extends outwardly from each side of said body, said means for directing a control medium being located to direct fluid outwardly on each side of each of said control members.

13. A flying body according to claim 12, wherein said means for directing a control medium are arranged within said body, said body having openings therethrough for directing the medium in the span direction of said control members.

14. A flying body according to claim 10, wherein said means for directing a control medium outwardly include means within said control members, said control members having at least one opening therein for directing the medium outwardly through said opening.

* * * * *